United States Patent
Heberle et al.

(10) Patent No.: US 11,786,845 B2
(45) Date of Patent: Oct. 17, 2023

(54) FILTER ELEMENT

(71) Applicant: Pall Corporation, Port Washington, NY (US)

(72) Inventors: Lara Heberle, Cortland, NY (US); Matthew J. Verschneider, Cortland, NY (US)

(73) Assignee: PALL CORPORATION, Port Washington, NY (US)

( * ) Notice: Subject to any disclaimer, the term of this patent is extended or adjusted under 35 U.S.C. 154(b) by 121 days.

(21) Appl. No.: 17/231,611

(22) Filed: Apr. 15, 2021

(65) Prior Publication Data

US 2022/0331718 A1    Oct. 20, 2022

(51) Int. Cl.
*B01D 29/23* (2006.01)
*B01D 29/11* (2006.01)

(52) U.S. Cl.
CPC .......... *B01D 29/232* (2013.01); *B01D 29/111* (2013.01); *B01D 2201/0415* (2013.01); *B01D 2201/12* (2013.01); *B01D 2201/291* (2013.01); *B01D 2201/325* (2013.01)

(58) Field of Classification Search
CPC ................ B01D 29/232; B01D 29/111; B01D 2201/0415; B01D 2201/12; B01D 2201/291; B01D 2201/325; B01D 39/083; B01D 39/1615; B01D 39/2017; B01D 2275/105; B01D 29/21; B01D 46/0031; B01D 46/2411; B01D 46/523
See application file for complete search history.

(56) References Cited

U.S. PATENT DOCUMENTS

| | | | |
|---|---|---|---|
| 4,706,503 A | 11/1987 | Kamentser | |
| 4,770,776 A | 9/1988 | Spet | |
| 7,373,825 B2 | 5/2008 | Fennington, Jr. | |
| 7,861,608 B2 | 1/2011 | Furey et al. | |
| 8,491,184 B2 | 7/2013 | Kamen et al. | |
| 8,817,259 B2 | 8/2014 | Schick et al. | |
| 9,279,746 B2 | 3/2016 | Wynn | |
| 9,737,855 B2 | 8/2017 | Neitzel et al. | |
| 9,874,301 B2 | 1/2018 | Eisner et al. | |
| 10,215,597 B2 | 2/2019 | Gagne et al. | |
| 10,502,650 B2 | 12/2019 | Gagne et al. | |

(Continued)

FOREIGN PATENT DOCUMENTS

| | | |
|---|---|---|
| CN | 102233219 A | 11/2011 |
| CN | 102292136 A | 12/2011 |

(Continued)

OTHER PUBLICATIONS

European Patent Office, extended European Search Report in counterpart European Patent Application No. 20170154.7 dated Oct. 7, 2020.

(Continued)

*Primary Examiner* — Waqaas Ali
(74) *Attorney, Agent, or Firm* — Leydig, Voit & Mayer, Ltd.

(57) ABSTRACT

Fibrous porous filter elements formed by joining two fibrous porous sections, porous filters comprising the joined sections, filter baskets and filter devices comprising the elements and filters, methods of making the filter elements and filters, and methods of filtration using the filter elements and filters, are disclosed.

19 Claims, 10 Drawing Sheets

(56) References Cited

U.S. PATENT DOCUMENTS

| | | | |
|---|---|---|---|
| 10,557,739 B2 | 2/2020 | Gagne et al. | |
| 2011/0252757 A1* | 10/2011 | Olson | B01D 46/2407 55/486 |
| 2011/0308524 A1 | 12/2011 | Brey et al. | |
| 2012/0119101 A1 | 5/2012 | Wynn | |
| 2012/0211408 A1* | 8/2012 | Hopkins | B01D 46/2411 210/232 |
| 2012/0256641 A1 | 10/2012 | Andersson et al. | |
| 2014/0131270 A1 | 5/2014 | Zeiler et al. | |
| 2015/0323486 A1 | 11/2015 | Schick et al. | |
| 2020/0003590 A1 | 1/2020 | Gagne et al. | |

FOREIGN PATENT DOCUMENTS

| | | |
|---|---|---|
| CN | 103561842 A | 2/2014 |
| CN | 103816746 A | 5/2014 |
| CN | 106457099 A | 2/2017 |
| EP | 3 136 062 A1 | 3/2017 |
| JP | H7-185267 A | 7/1995 |
| WO | WO 2005/045422 A1 | 5/2005 |
| WO | WO 2006/055710 A2 | 5/2006 |
| WO | WO 2006/074383 A2 | 7/2006 |
| WO | WO 2016/100396 A1 | 6/2016 |

OTHER PUBLICATIONS

Endress Hauser: "Dipfit CPA240 Flow assembly for pH or ORP sensors", retrieved from the Internet: URL: https://portal.endress.com/wa001/dla/5000319/0427/000/01/TI00179CEN_1319.pdf, Feb. 28, 2019, pp. 1-12.

Endress Hauser: "Operating Instructions CYA251 Flow assembly for nitrate/SAC, turbidity and oxygen sensors", retrieved from the Internet: URL: https://portal.endress.com/wa001/dla/5000491/1479/000/02/BA00495CEN_0318.pdf, Jan. 15, 2019, pp. 1-36.

Emerson: "Installation & Calibration Equipment Sensor & Instrument Mounting, Accessories, Systems and More", retrieved from the Internet: URL: https://www.emerson.com/documents/automation/flyer-installation-calibration-equipment-rosemount-en-71662.pdf, Dec. 31, 2012, pp. 1-48.

European Patent Office, Extended European Search Report issued in counterpart European Patent Application No. 22168139.8, dated Jul. 21, 2022.

Taiwan Intellectual Property Office, Office Action issued in counterpart Taiwan Patent Application No. 111113836, dated Apr. 21, 2023.

China National Intellectual Property Administration, Office Action issued in counterpart Chinese Patent Application No. 202210397322.9, dated Aug. 23, 2023.

* cited by examiner

FILTER ELEMENT

BACKGROUND OF THE INVENTION

In order to provide filters of a desired length, shorter filter elements and/or filter cartridges are combined using joiner caps or locks, e.g., plastic pieces on each of the elements and/or cartridges that are mechanically locked or engaged. There is a need for improved filters of desired lengths.

The present invention provides for ameliorating at least some of the disadvantages of the prior art. These and other advantages of the present invention will be apparent from the description as set forth below.

BRIEF SUMMARY OF THE INVENTION

An aspect of the invention provides a porous filter element comprising: (a) a first fibrous porous section having a top end, a bottom end, a first side end, a second side end, a first planar surface, a second planar surface, and a first fibrous porous section thickness; and (b) a second fibrous porous section having a top end, a bottom end, a first side end, a second side end, a first surface, a second planar surface, and a second fibrous porous section thickness; wherein the first or the second planar surface at the top end of the first fibrous porous section is joined to the first or the second planar surface at the top end of the second fibrous porous section by a joining member; or wherein the first or the second planar surface at the bottom end of the first fibrous porous section is joined to the first or the second planar surface at the bottom end of the second fibrous porous section by a joining member; the joining member having a portion forming a protrusion on the first or the second planar surface of the first fibrous porous section, or on the first or the second planar surface of the second fibrous porous section.

Another aspect of the invention provides a porous filter element comprising: (a) a first fibrous porous section having a top end, a bottom end, a first side end, a second side end, a first planar surface, a second planar surface, and a first fibrous porous section thickness; and (b) a second fibrous porous section having a top end, a bottom end, a first side end, a second side end, a first surface, a second planar surface, and a second fibrous porous section thickness; wherein the first or the second planar surface at the top end of the first fibrous porous section is joined to the first or the second planar surface at the top end of the second fibrous porous section; or wherein the first or the second planar surface at the bottom end of the first fibrous porous section is joined to the first or the second planar surface at the bottom end of the second fibrous porous section; and an upright joining member is formed, the upright joining member being subsequently folded over such that a surface of the upright joining member contacts the first or the second planar surface of the first fibrous porous section or the first or the second planar surface of the second fibrous porous section.

Other aspects of the invention include a porous filter including at least one fibrous porous filter element (in some aspects, at least two porous filter elements); a multiple filter basket comprising a filter basket housing configured to hold at least one fibrous porous filter element or at least one porous filter including a fibrous porous filter element, preferably, at least two fibrous porous filter elements or at least two porous filters; a filter device comprising at least one porous filter comprising the fibrous porous filter element arranged in a filter housing across a fluid flow path; methods of making the fibrous porous filter element; a filter device comprising a multiple filter basket comprising a filter basket housing configured to hold at least one fibrous porous filter element or at least one porous filter including a porous filter element, preferably, at least two fibrous porous filter elements or at least two porous filters, arranged in a filter device housing across a fluid flow path; and methods of using the fibrous porous filter element and porous filter.

BRIEF DESCRIPTION OF THE SEVERAL VIEWS OF THE DRAWING(S)

FIGS. 4A-4C show perspective views of a filter basket for holding at least one porous filter shown in FIG. 3 according to an aspect of the invention, wherein the filter is inserted into the filter basket.

FIGS. 5A-5C shown a filter device including an inlet and an outlet and defining a fluid flow path between the inlet and the outlet, for holding a filter element holder containing one or more porous filters across the fluid flow path according to an aspect of the invention.

DETAILED DESCRIPTION OF THE INVENTION

In accordance with an aspect of the invention, a fibrous porous filter element is provided comprising: (a) a first fibrous porous section having a top end, a bottom end, a first side end, a second side end, a first planar surface, a second planar surface, and a first fibrous porous section thickness; and (b) a second fibrous porous section having a top end, a bottom end, a first side end, a second side end, a first surface, a second planar surface, and a second fibrous porous section thickness; wherein the first or the second planar surface at the top end of the first fibrous porous section is joined to the first or the second planar surface at the top end of the second fibrous porous section by a joining member; or wherein the first or the second planar surface at the bottom end of the first fibrous porous section is joined to the first or the second planar surface at the bottom end of the second fibrous porous section by a joining member; the joining member having a portion forming a protrusion on the first or the second planar surface of the first fibrous porous section, or on the first or the second planar surface of the second fibrous porous section.

Another aspect of the invention provides a fibrous porous filter element comprising: (a) a first fibrous porous section having a top end, a bottom end, a first side end, a second side end, a first planar surface, a second planar surface, and a first fibrous porous section thickness; and (b) a second fibrous porous section having a top end, a bottom end, a first side end, a second side end, a first surface, a second planar surface, and a second fibrous porous section thickness; wherein the first or the second planar surface at the top end of the first fibrous porous section is joined to the first or the second planar surface at the top end of the second fibrous porous section; or wherein the first or the second planar surface at the bottom end of the first fibrous porous section is joined to the first or the second planar surface at the bottom end of the second fibrous porous section; and an upright joining member is formed, the upright joining member being subsequently folded over such that a surface of the upright joining member contacts the first or the second planar surface of the first fibrous porous section or the first or the second planar surface of the second fibrous porous section.

Another aspect of the invention provides a porous filter comprising at least one fibrous porous filter element according to an aspect of the invention. In some aspects, the fibrous porous element includes one or more additional fibrous porous sections and/or the porous filter includes at least two porous filter elements. In one preferred aspect, the porous filter is a pleated filter.

In another aspect a filter basket is provided, the filter basket comprising a filter basket housing having a first end and a second end, and a side wall with openings therethrough, wherein the filter basket is configured to hold at least one porous filter element or at least one porous filter including a porous filter element according to an aspect of the invention, wherein the filter basket has a hollow section open at the first end for receiving a porous filter element or a porous filter including the porous filter element. Since aspects of the filter basket can include separate hollow sections open at the first end for receiving a porous filter element or porous filter including a porous filter element, the filter basket can be configured (by including the appropriate number of sections) to hold any number of porous filter elements or porous filters including porous filter elements.

In another aspect, a filter device is provided, comprising a device housing having an inlet and an outlet and defining a fluid flow path between the inlet and the outlet, and at least one fibrous porous filter element or at least one porous filter including a fibrous porous filter element according to an aspect of the invention, arranged in the housing across the fluid flow path. If desired, the filter device can include a filter basket including at least one porous filter element or at least one porous filter including a porous filter element, wherein the filter basket is arranged in the filter device housing such that each of the porous filter elements or porous filters including porous filter elements are across the fluid flow path.

Other aspects of the invention methods of making the fibrous porous filter elements and porous filters, and methods of using the fibrous porous filter elements and porous filters.

In one aspect, a method of making a filter element comprises placing a first fibrous porous medium in contact with a second fibrous porous medium such that respective surfaces of the first fibrous porous medium and the second fibrous porous medium contact each other; joining the first fibrous porous medium to the second fibrous porous medium at an end of the first fibrous porous medium and an end of the second fibrous porous medium, wherein the end of the first fibrous porous medium is in contact with the end of the second fibrous porous medium, forming a joining member; and, spreading the first fibrous porous medium away from the second fibrous porous medium, wherein the first fibrous porous medium remains joined to the second fibrous porous medium by the joining member.

In a preferred aspect, the method further comprises folding over a portion of the joining member.

Aspects of the method can include making additional filter elements, and subsequently placing one filter element on top of another filter element before producing a porous filter.

Advantageously, filter elements according to aspects of the invention can be produced with one or more any of the following: fewer parts, less complex machinery, and less labor, as compared to the production of filter elements with joiner caps to join the elements. Additionally, since the filter elements are joined without joiner caps, there is less risk of a failure mode due to incorrect joining of filter elements.

The filter quality/filter efficiency of filter elements according to aspects of the invention is essentially the same as that for filter elements with joiner caps.

Each of the components of the invention will now be described in more detail below, wherein like components have like reference numbers.

Figure 1:
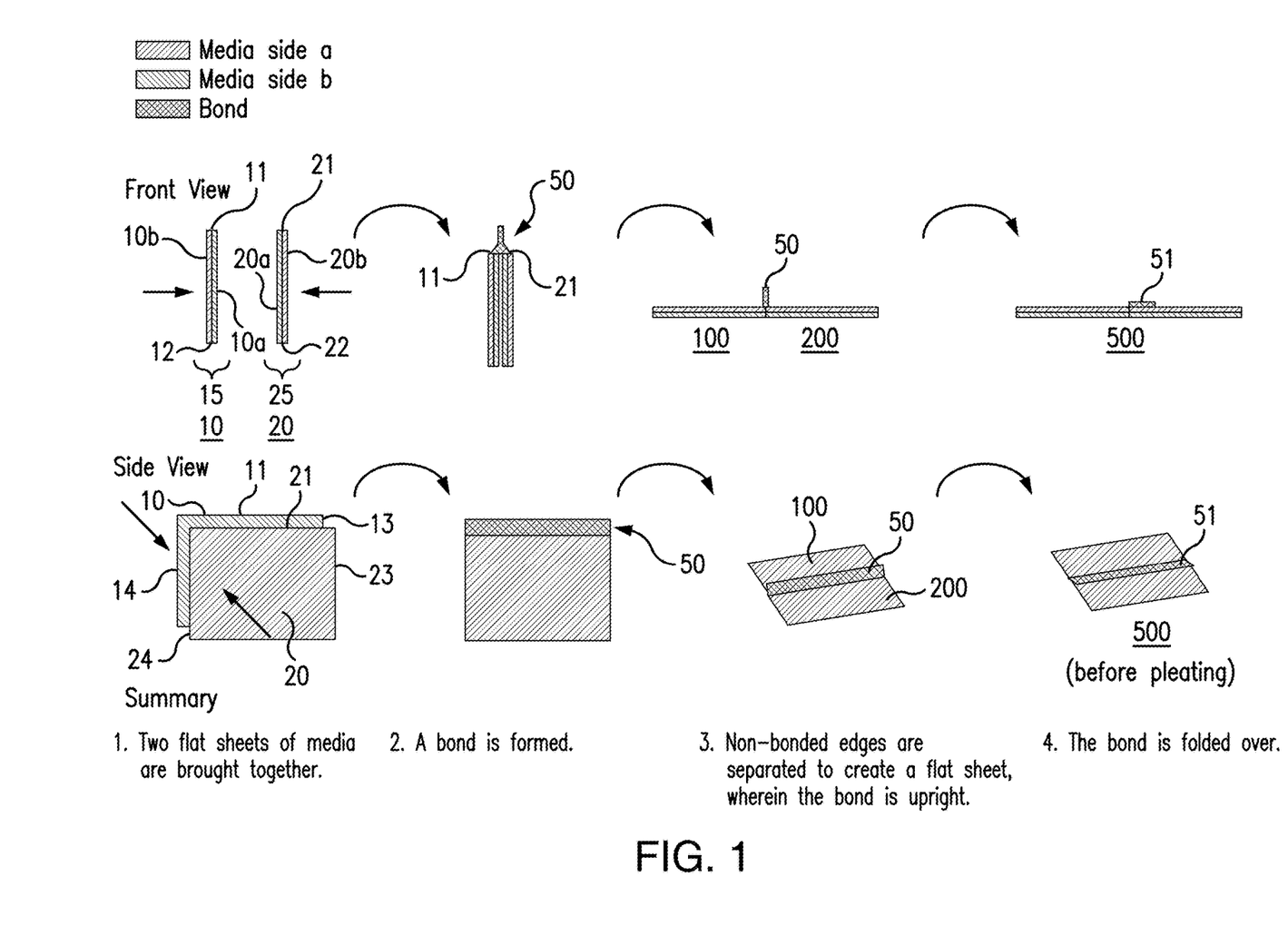
FIG. 1 is a diagrammatic illustration of forming a porous filter element according to an aspect of the invention.

As shown in FIG. 1, two sheets of fibrous porous media 10, 20 (shown as flat fibrous porous media) are placed in contact with each other.

The illustrated first fibrous porous medium 10 has a first planar surface 10*a*, a second planar surface 10*b*, a top end 11, a bottom end 12, a first side end 13, a second side end 14, and a first porous medium thickness 15. The illustrated second fibrous porous medium 20 has a first planar surface 20*a*, a second planar surface 20*b*, a top end 21, a bottom end 22, a first side end 23, a second side end 24, and a second porous medium thickness 25. For ease of reference in this diagrammatic illustration, planar surfaces 10*a* and 20*a* are placed in contact with each other, and they are joined by a joining member 50 at their top ends 11 and 21, but it should be clear that either planar surface of one porous medium can be placed in contact with either planar surface of the other porous medium, and the references to "top," "bottom," or "side" ends is arbitrary, the joining member is formed at a contact point where one end of a porous medium contacts an end of the other porous medium and the media are joined at those ends.

As further shown in FIG. 1, after joining, the porous media are spread apart, providing a first fibrous porous section 100 and a second fibrous porous section 200, with the joining member 50 (containing portions of porous media 10 and 20) facing upwardly, e.g., generally perpendicular to planar surfaces 10*b* and 20, and the joining member is subsequently folded over (forming a protrusion 51 on one side), providing a porous filter element 500 (shown in FIGS. 2A, 2D, and 3 as a pleated filter element). Preferably, the surface of the fibrous porous filter element that will be the upstream side of a filter including the porous filter element includes the folded over joining member (side 552 in FIG. 2C includes the folded over joining member; wherein side 551 shows a connection seam 57 (see also, FIGS. 3 and 5C) to reduce peel stress on the joining member.

Figure 2A:
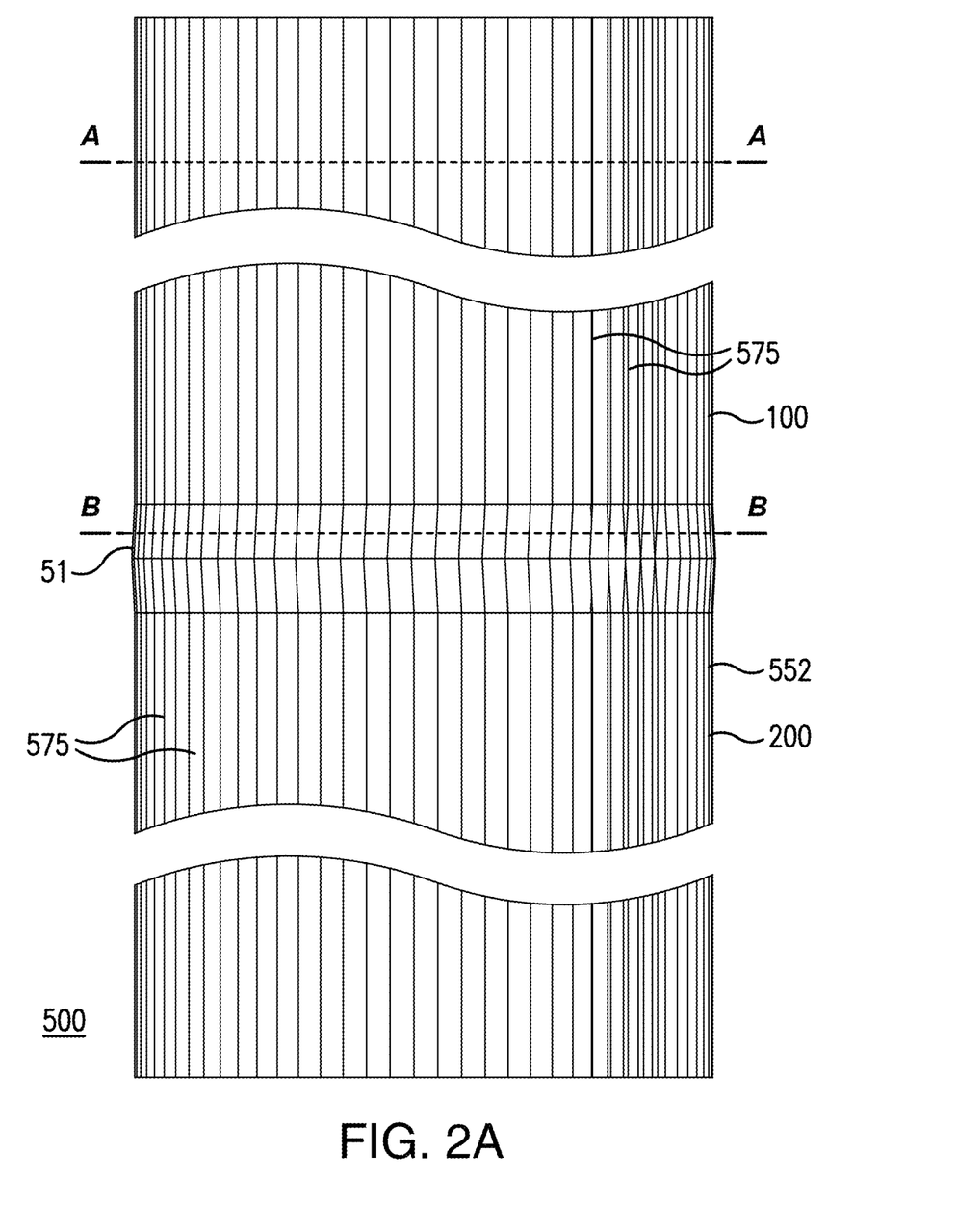
FIG. 2A is a side view of a porous filter element according to an aspect of the invention, wherein the filter element has been pleated to form a pleated, hollow cylindrical element.
Figure 2B:
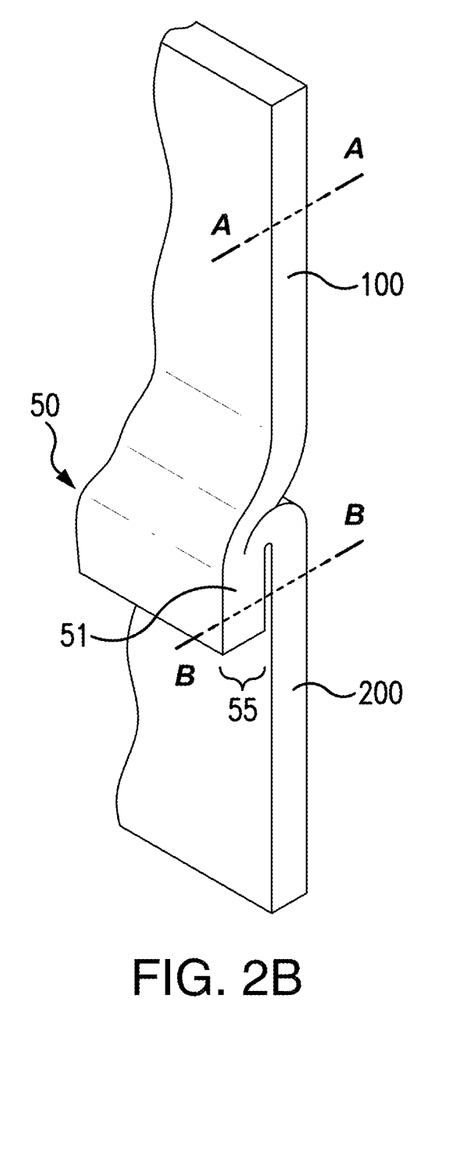
FIG. 2B is a diagrammatic perspective view of the folded over joining member cut vertically from line A-A through line B-B of detail C in FIG. 2A (pleat not shown), showing a folded over protrusion on one side.
Figure 2C:
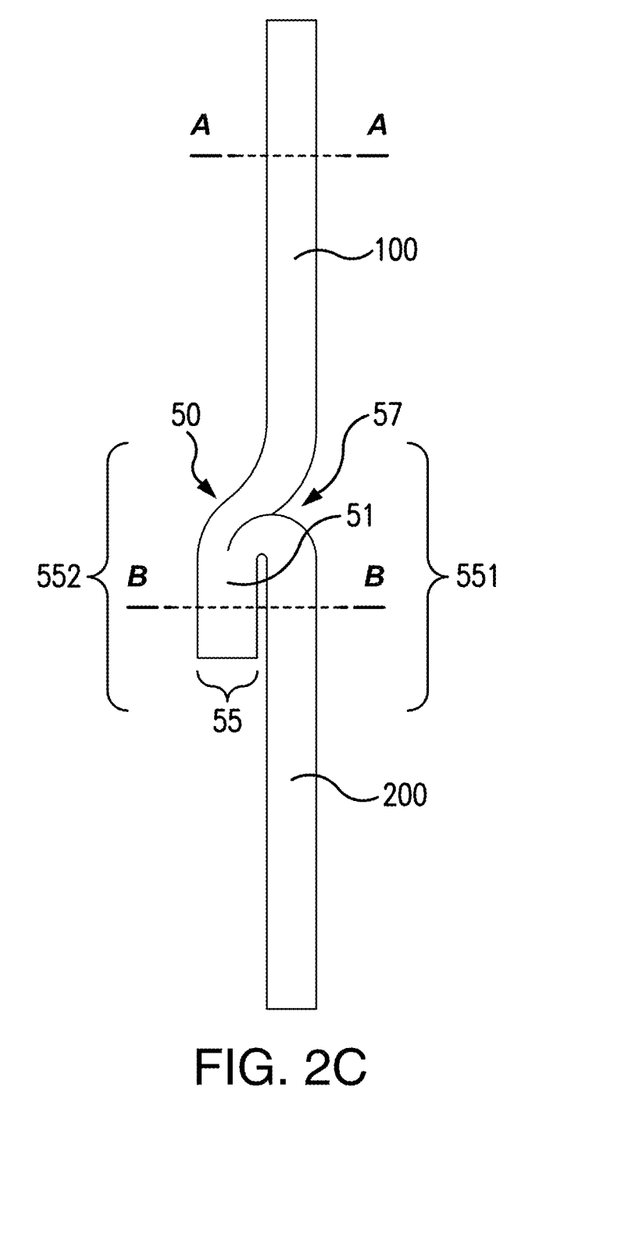
FIG. 2C is a diagrammatic side view of the folded over joining member cut vertically from line A-A through line B-B of detail C in FIG. 2A.

As shown in more detail in FIGS. 2B and 2C, the joining member 50 has a portion forming a protrusion 51 on the first or the second planar surface of the first fibrous porous section, or on the first or the second planar surface of the second fibrous porous section, and a seam 57 on or at the surfaces where the fibrous porous sections are joined (on the opposing surfaces from where the protrusion is formed). In some aspects; the protrusion has a protrusion thickness 55 that is greater than the thickness of the first fibrous porous section 15, and greater than the thickness 25 of the second fibrous porous section, or a protrusion thickness than is less than the thickness of the first fibrous porous section 15, and less than the thickness 25 of the second fibrous porous section. For example, the protrusion thickness can be in the range of from about half to about twice the thickness of the first fibrous porous section 15 and the thickness of the fibrous porous section 25.

If desired, at least two fibrous porous filter elements can be separately produced as described above, and one produced element can be placed on top of the other produced element (e.g., wherein the bottom surface of one element contacts the upper surface of the other element), before producing a porous filter including the fibrous porous filter elements, e.g., wherein the porous filter has an upstream fibrous porous filter element providing prefiltration, and a downstream fibrous porous filter element providing finer filtration.

Figure 2D:
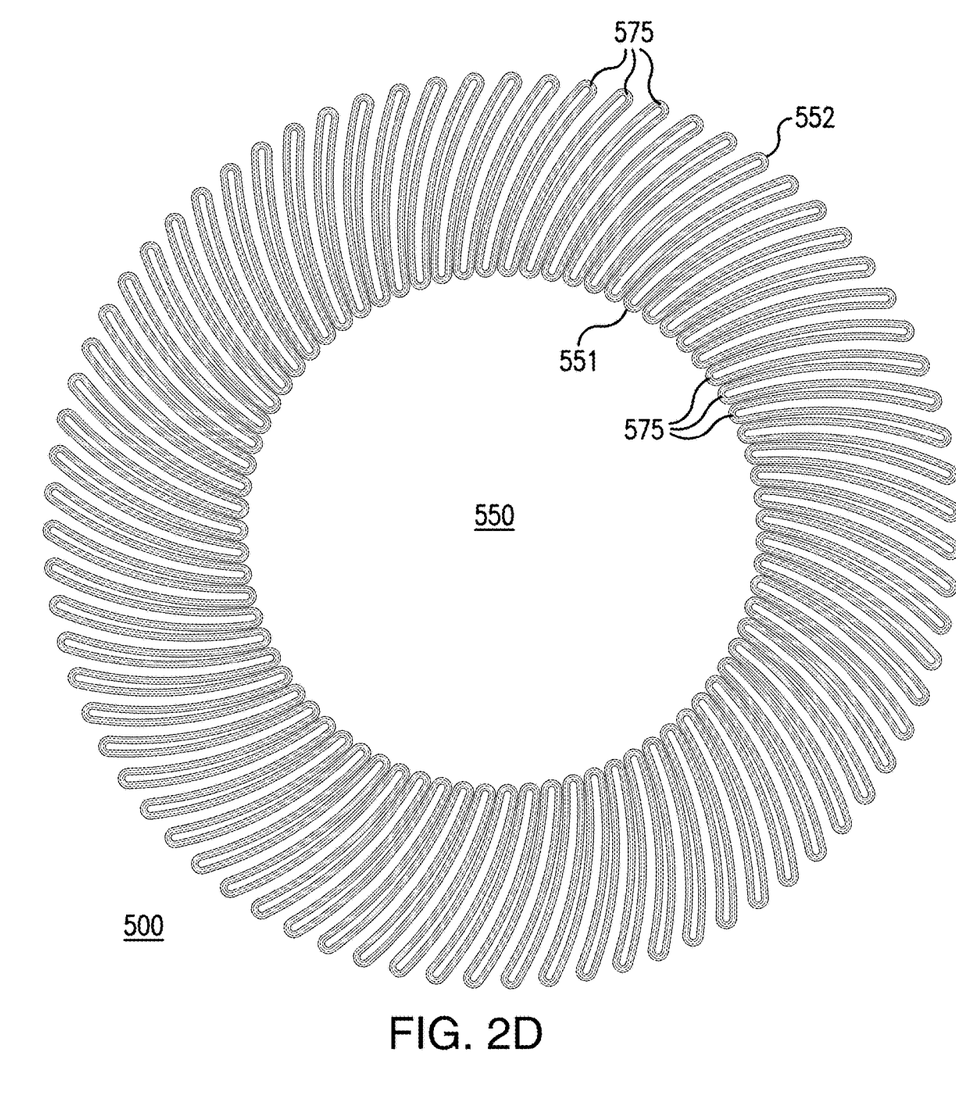
FIG. 2D is an end view of the filter element shown in FIG. 2A.
Figure 3:
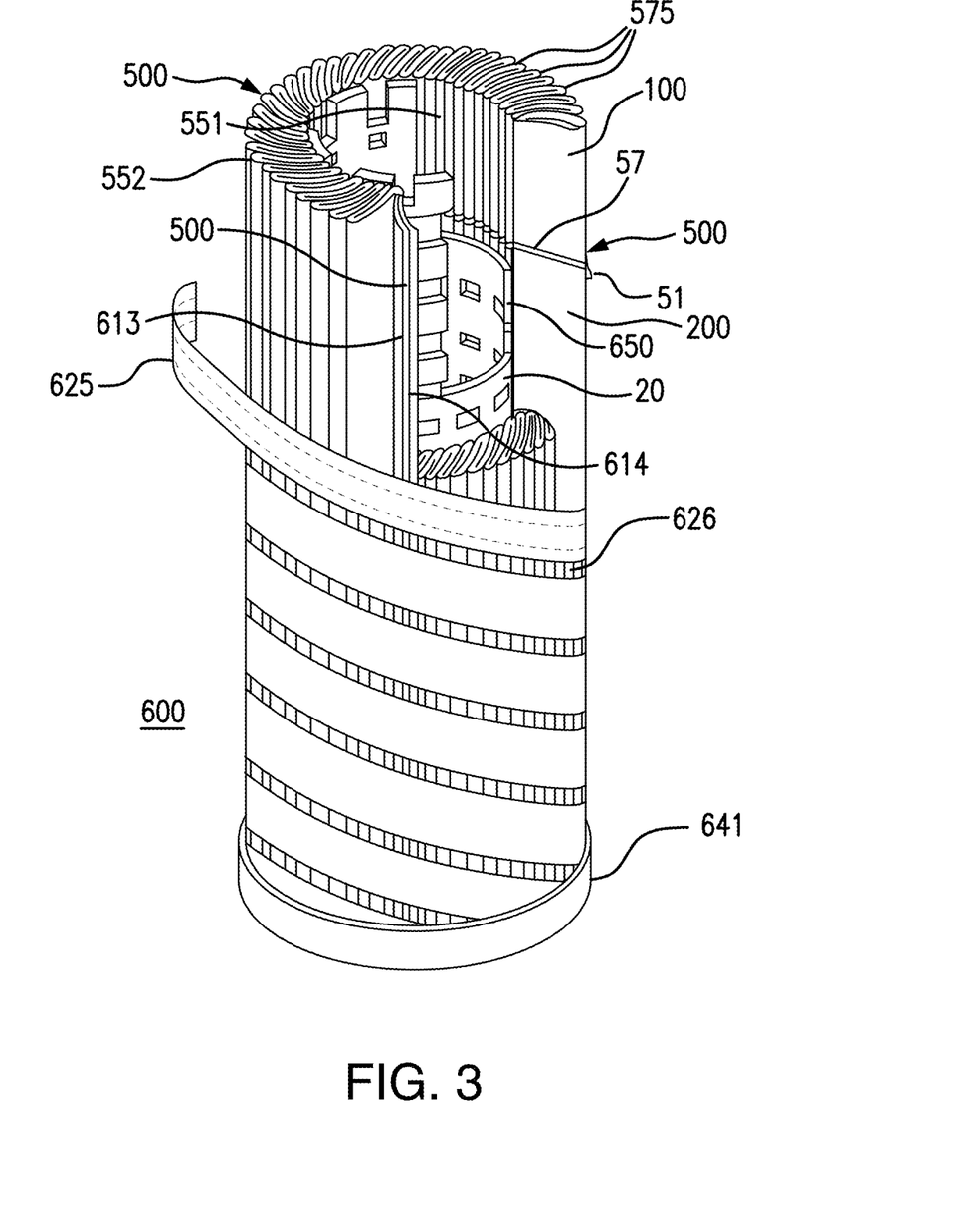
FIG. 3 is a partial cut-away perspective view of a porous filter including the porous filter element shown in FIG. 2A.

In a preferred aspect, as shown in FIGS. 2A, 2D, and 3, the porous filter element is pleated, forming a hollow cylindrical pleated porous filter element 500, having a central cavity 550, an inner surface 551 (both shown in FIG. 2D, seam 57 not shown, shown in FIG. 3), an outer surface 552 and a plurality of pleats 575 (both shown in FIGS. 2A, 2D, and 3). In the aspect shown in FIGS. 3 and 5C (showing porous filter 600 including porous filter element 500), the seam 57 is shown on the inner surface 551. For illustrative purposes (e.g., to illustrate seam 57), the porous element 100 in porous filter 500 is shown shortened view.

Porous filters and fibrous porous filter elements according to aspects of the invention can include elements, layers and/or components, and configurations as disclosed in, for example, U.S. Pat. Nos. 5,543,047 and 9,744,484.

In some aspects, the fibrous porous filter element and/or a porous filter including the porous filter element according to one or more aspects of the invention can include additional elements, layers, and/or components, that can have different structures and/or functions, e.g., at least one of any one or more of the following: prefiltration, support, drainage, spacing and cushioning. Illustratively, the porous filter element and/or a porous filter including the porous filter element according to an aspect of the invention further comprises one or more of any of the following: a core, a drainage element, and a support element.

Typically, the fibrous porous filter element and/or a porous filter including at least one porous filter element includes at least one additional element (for example, a drainage element) such as a mesh and/or a screen, and in some aspects, has additional elements contacting the upstream surface and the downstream surface. In desired, at least one of the additional elements can be placed in contact with a surface of the porous filter element before pleating.

In the aspect of the porous filter 600 including porous element 500 shown in FIG. 3, the porous filter includes a downstream drainage element 614 and an upstream drainage element 613 contacting, respectively, the downstream and upstream surfaces of the porous filter element 500, wherein a portion of the downstream drainage element is not shown to illustrate seam 57, and a portion of the upstream drainage element is not shown to illustrate protrusion 51.

In one aspect, the porous filter includes an outer wrap member, which can be porous (for example, a mesh or screen) or non-porous, e.g., for support. If desired, the wrap member can comprise as a helical wrap. For example, the aspect shown in FIG. 3 includes an outer wrap member 625. A helical wrap can be wrapped around the filter element with or without overlap between adjacent turns of the wrap, and if desired, as shown in FIGS. 2E and 3, there can be gaps 626 between adjacent turns of the wrap member.

Figure 4A:
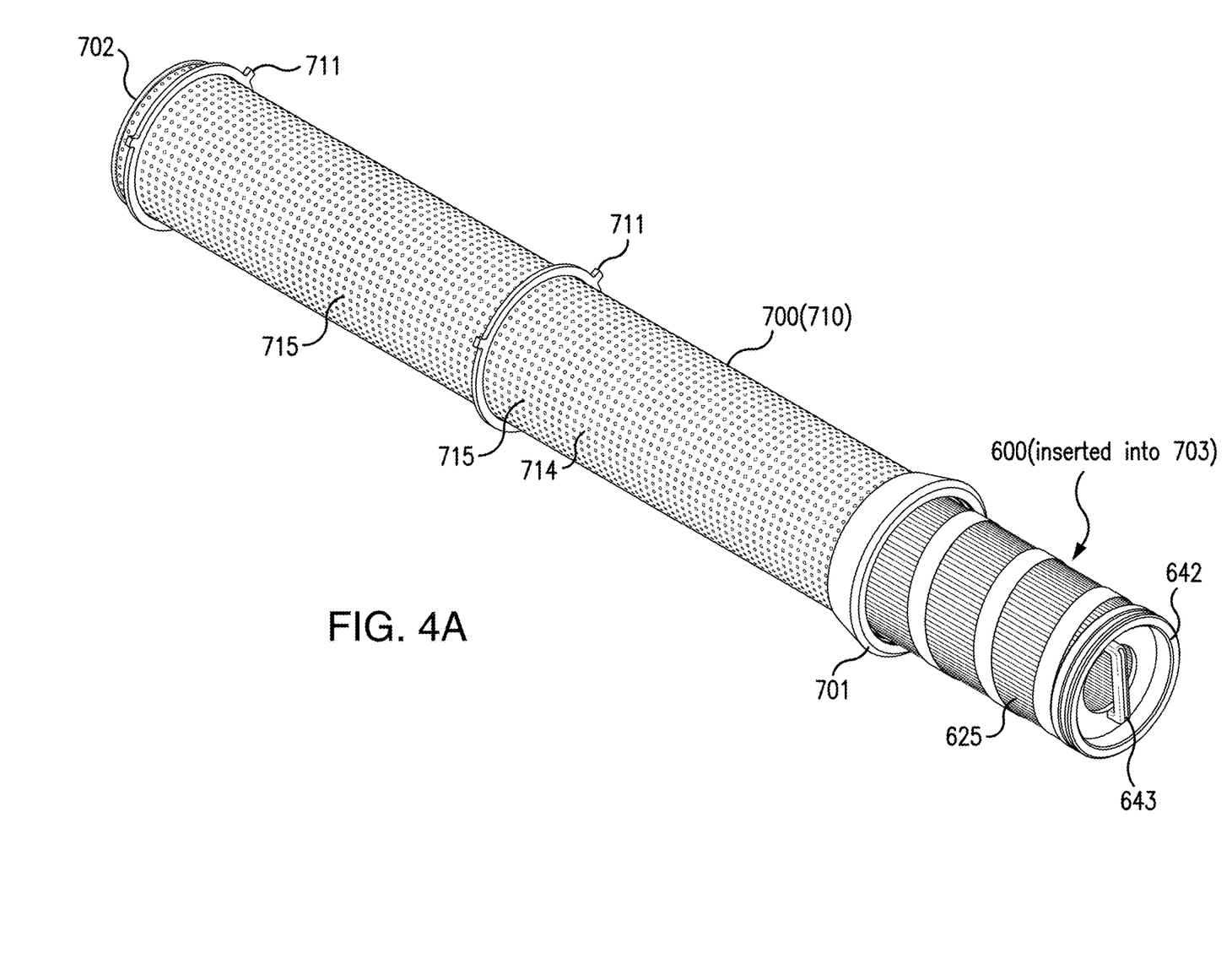
FIG. 4A shows the porous filter being inserted into the first (top) end of the filter basket.
Figure 4B:
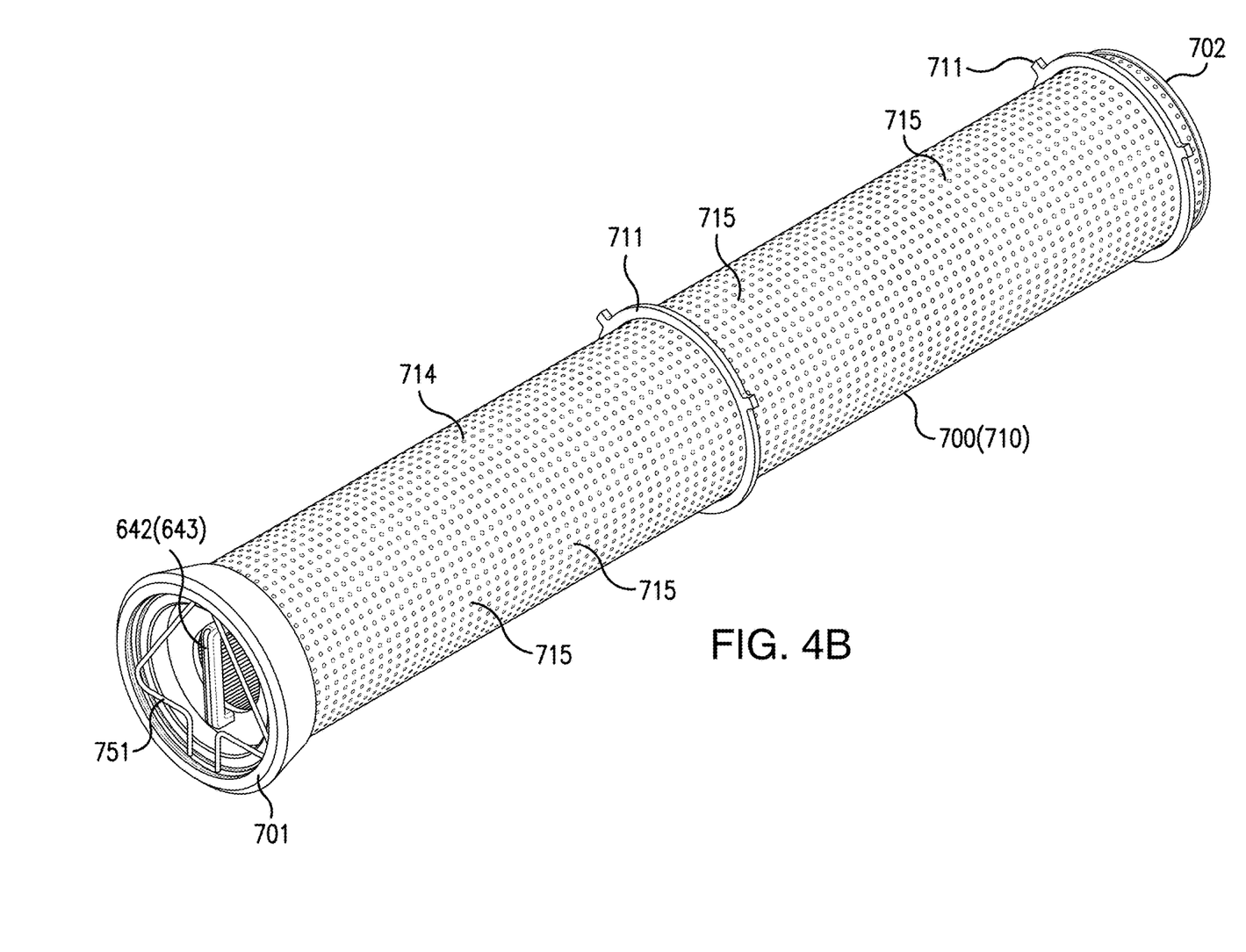
FIG. 4B shows the porous filter inserted into the filter basket and retained with a filter retainer.
Figure 4C:
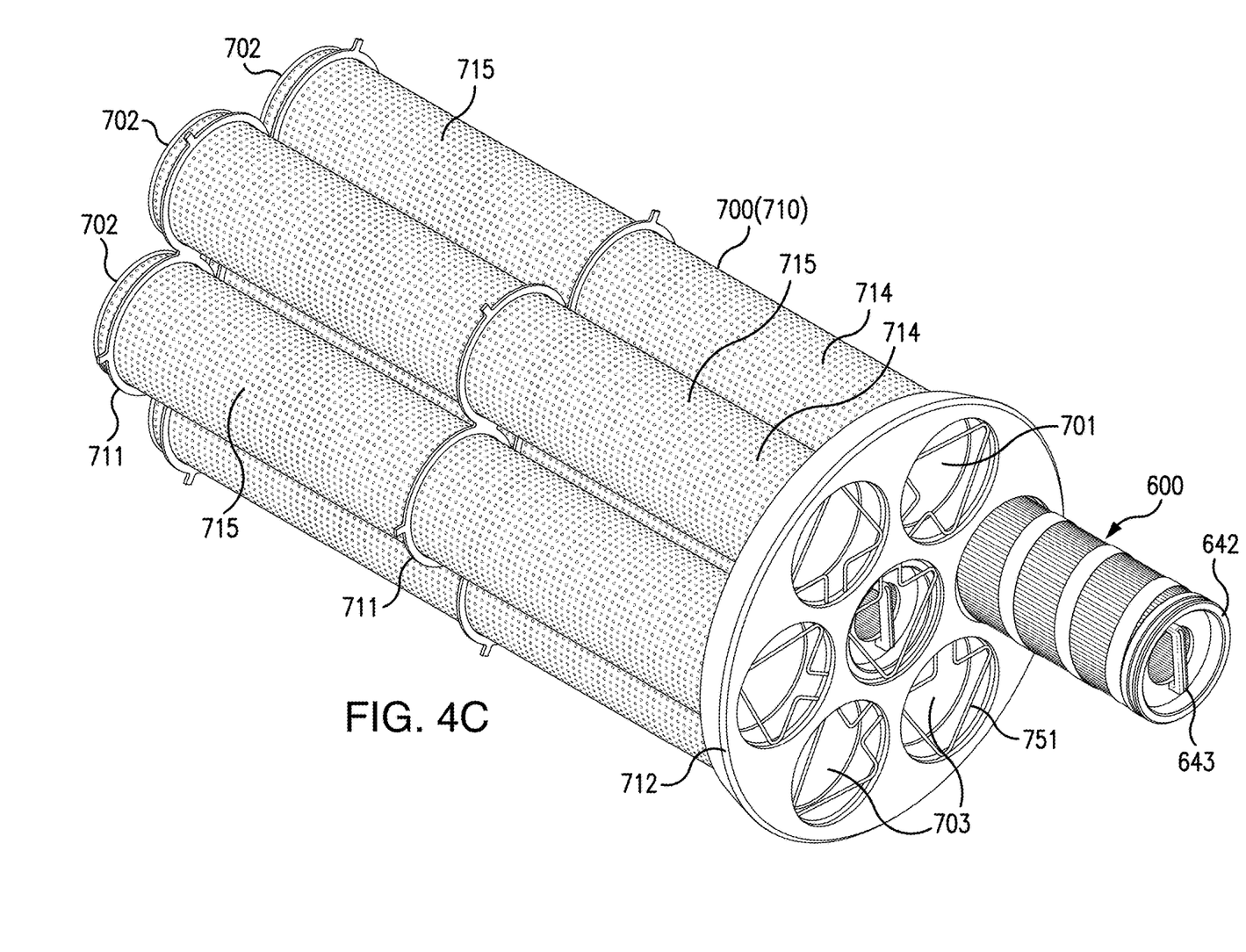
FIG. 4C shows a multiple filter basket wherein one porous filter has been inserted and retained, and another porous filter is being inserted.

Alternatively or additionally, in some aspects, the porous filter includes one or more of any of the following: end caps, an inner core, and an outer cage. Illustratively, the aspect shown in FIG. 3 shows an inner perforated core 650 and an end cap 641 at one end of the porous filter (in some aspects, the porous filter includes end caps at each end, e.g., FIGS. 4A-4C show an end cap 642 at the other end of the filter, wherein the illustrated end cap 642 includes a handle 643). In some aspects, end cap 642 is a closed end cap, and end cap 643 (e.g. as shown in FIGS. 4A-4C) is an open end cap.

In another aspect a filter basket is provided, the filter basket comprising a housing having a first end and a second end and a side wall with openings therethrough, wherein the filter basket is adapted to hold at least one porous filter element or at least one porous filter including a porous filter element according to an aspect of the invention, wherein the filter basket has hollow sections open at the first end for receiving a porous filter element or a porous filter including the porous filter element. The filter basket can be configured (by including the appropriate number of sections) to hold any number of porous filter elements or porous filters including porous filter elements.

FIGS. 4A-4C shows a filter basket 700 comprising a filter basket housing 710 having a first (top) end 701 and a second (bottom) end 702, a side wall with openings (or perforations) 715 therethrough and a hollow section 703 open at the first end 701 for receiving a porous filter element or a porous filter including a porous filter element according to an aspect of the invention, such that fluid flow paths are provided from the first end through the openings in the side wall, wherein the porous filter element or a porous filter including the porous filter element is across the fluid flow path. A filter basket can have any number of openings in the side wall, and the openings can be arranged in a variety of patterns, if desired.

A filter basket can be configured with corresponding sections with open ends to receive any number of porous filter elements or porous filters including porous filter elements according to an aspect of the invention. In FIG. 4C, the filter basket is configured to receive 7 porous filters 600. In some aspects, as shown in FIGS. 4B and 4C, a filter retainer 751 (illustrated as a bent wire) is inserted (e.g., fit in a groove near the open end of the section) to retain the porous filter in the filter basket housing. If desired, as shown in FIGS. 4A-4C, the filter basket can include one or more spider plates 711 fitted over the outside surfaces of the filter basket housings for each filter, e.g., to keep the filters separated to equalize flow through the filters and holder, and/or to allow a path for permeate fluid to fall down and/or to give support to the "free" ends of the holders.

If desired, particularly if the filter basket is configured to hold a plurality of porous filter elements or porous filters including porous filter elements, the filter basket can include, as illustrated in FIG. 4C, an end plate 712 secured (e.g., welded) to the first ends 701 of the filter basket housings. Typically, second (bottom) end 702 is closed, though in some aspects, it may include a small opening.

In another aspect, a filter device is provided, comprising a filter device housing having an inlet and an outlet and defining a fluid flow path between the inlet and the outlet, and at least one porous filter element or at least one porous filter including a porous filter element according to an aspect of the invention, arranged in the housing across the fluid flow path. If desired, the filter device can include a filter basket including at least one porous filter element or at least one porous filter including a porous filter element, wherein the filter basket is arranged in the filter device housing such that each of the porous filter elements or porous filters including porous filter elements are across the fluid flow path.

Figure 5A:
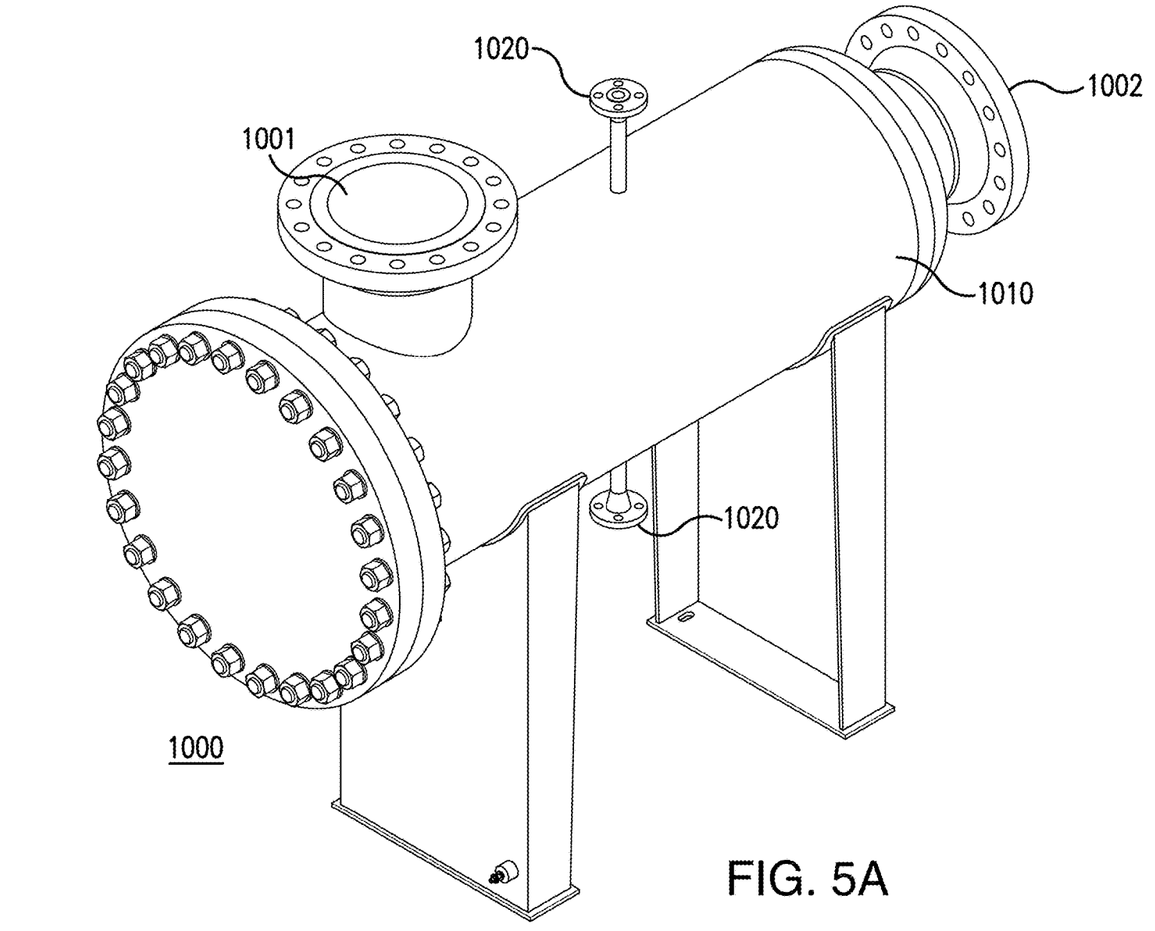
FIG. 5A is a perspective view of the filter device.
Figure 5B:
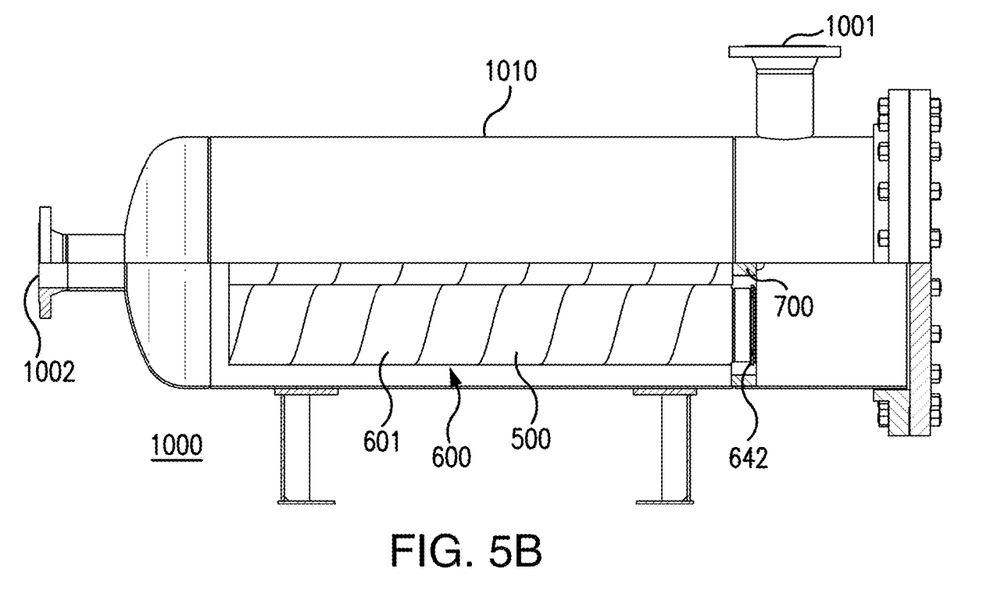
FIG. 5B is a partial cut-away view of the filter device including an inlet and an outlet and defining a fluid flow path between the inlet and the outlet, including the multiple filter element holder shown in FIG. 4C, also showing a side view of the porous filter shown in FIG. 3 according to an aspect of the invention, wherein the porous filters in the holder is arranged in a filter housing, such that inserted porous filters are across the fluid flow path.
Figure 5C:
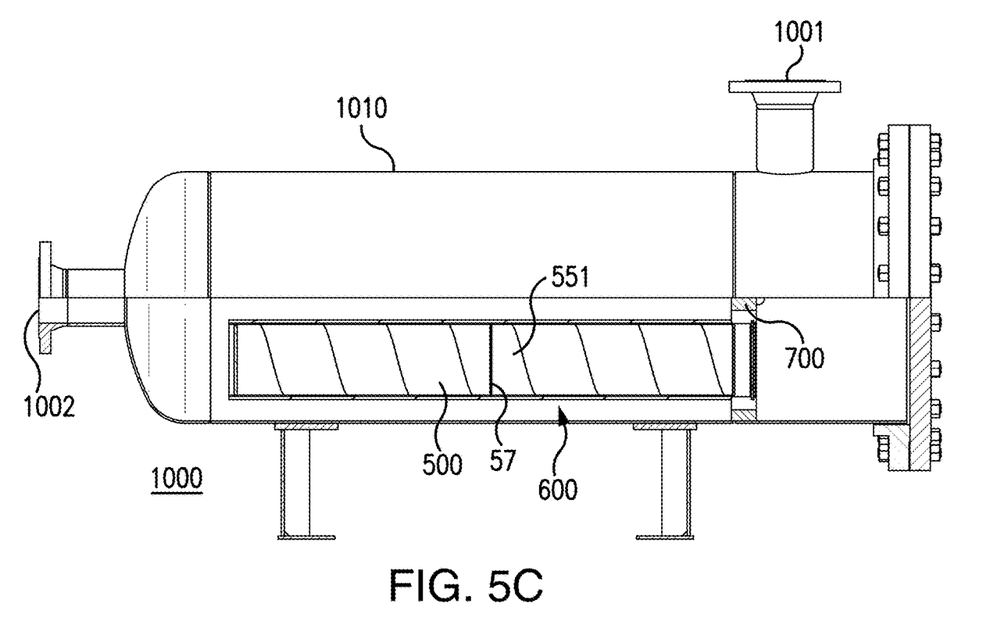
FIG. 5C shows the filter device shown in FIG. 5B, also showing a porous filter in cross-sectional view, also showing the seam between two joined fibrous porous sections on the side of the filter without the protrusion (on the downstream side of the filter, downstream drainage element not shown).

FIGS. 5A-5C show a filter device 1000 comprising a housing 1010 having an inlet 1001 and an outlet 1002, and defining a fluid flow path between the inlet and the outlet, wherein the filter basket 700 as shown in FIG. 4C, containing a plurality of porous filters 600, is arranged in the filter device across the fluid flow path, such that the plurality of porous filters are also across the fluid flow path (e.g., fluid passes through the inlet 1001, open end cap 642, through the porous filter (inside-out flow), through the openings 715, and the outlet 1002). Optionally, the filter device can include additional components, for example, one or more ports 1020 (e.g., for sampling and/or venting).

Preferably, at least the filter elements are sterilizable.

The filter basket housing and filter device housing can be fabricated from any suitable rigid impervious material which is compatible with the fluid being processed. Typically, the housing is fabricated from a metal, such as stainless steel.

In yet another aspect, a method of filtering fluid is provided, comprising passing fluid along the fluid flow path through the fibrous porous filter (e.g., in a filter basket or in a filter device with or without a filter basket), and removing undesirable material from the fluid as it passes through the fibrous porous filter.

A variety of porous media, including porous membranes and fibrous porous media, can be joined in accordance with aspects of invention, and the joined media can be configured to form filter elements and filters. Suitable porous media includes glass fibrous media, and fibrous media such as, for example, polyester, polypropylene, polyphenylene sulfide, and nylon.

The porous media can be joined (including thermally welded or thermally spliced) by a variety of techniques known in the art, for example, with melted adhesive (with or without pressure), or pressure and heat (such as thermal impulse splicing or continuous band sealer splicing), or pressure with heat and vibration (such as ultrasonic splicing).

A filter element can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element.

The filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869.

In accordance with aspects of the invention, the fibrous porous element and/or porous filter including the fibrous porous element can have a variety of configurations, including planar, pleated, and hollow cylindrical. In a preferred aspect, the filter element is configured as a pleated element, more preferably, a pleated, hollow cylindrical element, including a "laid-over-pleat" (LOP) filter configuration (as described in, for example, U.S. Pat. No. 5,543,047).

The following examples further illustrate the invention but, of course, should not be construed as in any way limiting its scope.

Example 1

This example demonstrates the formation of a filter element comprising fibrous glass media according to an aspect of the invention.

Two planar sheets of 22 inch wide fibrous porous media (glass fibers) on polyester substrates are brought together, with the sides that will be bonded together (the polyester substrates) touching each other. The sides that touch each other have lower melting points than the sides that do not touch each other. No separate sealant material is used.

Pressure and heat using an OK Continuous Thermal Band Sealer (OK International Corp., Marlboro, Mass.) which applied 30 psi of pressure at a temperature of 310° C. (590° F.) run at 60 feet per minute (fpm) nominal speed (about 10 fpm measured speed) to the top edge of the two sheets, wherein the pressure and heat is applied where the sheets contact each other with an overlap of at least about 0.1" such that the sides with the lower melting points melt together and form the joining member or splice, the joining member having a width of at least about 0.1".

The non-bonded bottom edges of the media sheets are then separated and spread apart so that the joined media sheets both lay flat.

The joining member, that faces upwardly (e.g., generally perpendicular to the planar surfaces of the sheets) is flattened against the planar surface of one of the sheets of media, wherein the side that will be the upstream side of the filter includes the folded over joining member to reduce peel stress on the joining member.

The resultant single flat sheet of media is subsequently corrugated (or pleated) after placing the single flat sheet of joined media between a sheet of nylon mesh and a sheet of Reemay® polyester fabric media, and a pleated hollow cylindrical filter pack is formed having an outer helical wrap of mesh and end caps at each end.

Example 2

This example demonstrates the formation of a filter element comprising fibrous polypropylene media according to an aspect of the invention.

Two pairs of two planar sheets of 22 inch wide fibrous porous media (polypropylene) are respectively and separately brought together. One pair of sheets are graded media, the other pair of sheets are absolute grade media. No separate sealant material is used.

An ultrasonic welder using approximately 32 μm amplitude vibrations and 35 lbf force applies 20 psi force at a temperature of about 240° F. to the top edge of each pair of the two sheets, wherein the thermal bond is provided where the sheets contact each other with an overlap of at least about 0.1" such that the sides melt together and form the joining member or splice, the joining member having a width of at least about 0.1".

The non-bonded bottom edges of each joined pair of the media sheets are then separated and spread apart so that the joined media sheets both lay flat.

The joining member, that faces upwardly (e.g., generally perpendicular to the planar surfaces of the sheets) is flattened against the planar surface of one of the sheets of each of the pairs of joined media, wherein the side that will be the upstream side of the filter includes the folded over joining member to reduce peel stress on the joining member.

The two single sheets of flat media are placed one on top of the other, sandwiched between sheets of polyphenyl sulfide (PPS) mesh (such that there is an inner mesh and an outer mesh), and are subsequently corrugated (or pleated), and a pleated hollow cylindrical filter pack is formed having an outer helical wrap of mesh, and end caps at each end, wherein the flat sheet of graded media provides a pre-filter layer, and the flat sheet of absolute grade media provides a filter layer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fibrous porous filter element comprising:
   (a) a first fibrous porous section having a top end, a bottom end, a first side end, a second side end, a first planar surface, a second planar surface, and a first fibrous porous section thickness; and
   (b) a second fibrous porous section having a top end, a bottom end, a first side end, a second side end, a first planar surface, a second planar surface, and a second fibrous porous section thickness;
   wherein the first planar surface or the second planar surface at the top end of the first porous fibrous section is joined to the first planar surface or the second planar surface at the top end of the second fibrous porous section by a joining member; or
   wherein the first planar surface or the second planar surface at the bottom end of the first fibrous porous section is joined to the first planar surface or the second planar surface at the bottom end of the second fibrous porous section by a joining member;
   the joining member having a portion forming a protrusion on the first planar surface or the second planar surface of the first fibrous porous section, or on the first planar surface or the second planar surface of the second fibrous porous section, wherein a thickness of the protrusion is less than a thickness of the first fibrous porous section and a thickness of the second fibrous porous section wherein the fibrous porous filter element of comprises a pleated filter element.

2. A fibrous porous filter element comprising:
   (a) a first fibrous porous section having a top end, a bottom end, a first side end, a second side end, a first planar surface, a second planar surface, and a first fibrous porous section thickness; and
   (b) a second fibrous porous section having a top end, a bottom end, a first side end, a second side end, a first planar surface, a second planar surface, and a second fibrous porous section thickness;
   wherein the first planar surface or the second planar surface at the top end of the first fibrous porous section is joined to the first planar surface or the second planar surface at the top end of the second fibrous porous section; or
   wherein the first planar surface or the second planar surface at the bottom end of the first fibrous porous section is joined to the first planar surface or the second planar surface at the bottom end of the second fibrous porous section;
   and an upright joining member is formed, the upright joining member being subsequently folded over forming a protrusion such that a surface of the upright joining member contacts the first planar surface or the second planar surface of the first fibrous porous section or the first planar surface or the second planar surface of the second fibrous porous section, wherein a thickness of the protrusion is less than a thickness of the first fibrous porous section and a thickness of the second fibrous porous section wherein the fibrous porous filter element of comprises a pleated filter element.

3. The fibrous porous filter element of claim 1, further comprising a drainage element and/or a support element.

4. A porous filter comprising at least two fibrous porous filter elements of claim 1.

5. A porous filter comprising the fibrous porous filter element of claim 1, further comprising an outer wrap and/or end caps.

6. A filter basket comprising a housing having a first end and a second end, a side wall with openings therethrough, and a hollow section open at the first end for receiving the porous filter of claim 4.

7. The filter basket of claim 6, having at least two sections open at the first end wherein each of the at least two sections can receive a porous filter of claim 4.

8. A filter device comprising a device housing having an inlet and an outlet and providing a fluid flow path between the inlet and the outlet, and at least one porous filter of claim 4 arranged in the housing across the fluid flow path.

9. The filter device of claim 8, including a filter basket holding the at least one porous filter, wherein the filter basket is arranged in the filter device housing across the fluid flow path.

10. A method of filtering a fluid, the method comprising passing the fluid through the fibrous porous filter element of claim 1.

11. A method of making the filter element of claim 1, the method comprising placing a first fibrous porous section in contact with a second fibrous porous section such that respective surfaces of the first fibrous porous section and the second fibrous porous section contact each other;

joining the first fibrous porous section to the second fibrous porous section at an end of the first fibrous porous section and an end of the second fibrous porous section, wherein the end of the first fibrous porous section is in contact with the end of the second fibrous porous section, forming a joining member; and, spreading the first fibrous porous section away from the second fibrous porous section, wherein the first fibrous porous section remains joined to the second fibrous porous section by the joining member.

12. The method of claim 11, further comprising folding over a portion of the joining member.

13. A porous filter comprising at least two fibrous porous filter elements of claim 1.

14. A method of filtering a fluid, the method comprising passing the fluid through the porous filter of claim 13.

15. A method of filtering a fluid, the method comprising passing the fluid through the porous filter of claim 4.

16. The filter basket of claim 6, having at least two sections open at the first end wherein each of the at least two sections can receive the porous filter of claim 13.

17. A filter device comprising a device housing having an inlet and an outlet and providing a fluid flow path between the inlet and the outlet, and at least one porous filter of claim 13 arranged in the housing across the fluid flow path.

18. The filter device of claim 16, including a filter basket holding the porous filter, wherein the filter basket is arranged in the filter device housing across the fluid flow path.

19. The fibrous porous filter element of claim 2, comprising a pleated filter element.

\* \* \* \* \*